(12) United States Patent
Zhang et al.

(10) Patent No.: US 10,768,356 B1
(45) Date of Patent: Sep. 8, 2020

(54) PANEL DEVICE FOR UNDER-DISPLAY CAMERA

(71) Applicant: WUHAN CHINA STAR OPTOELECTRONICS TECHNOLOGY CO., LTD., Wuhan (CN)

(72) Inventors: Peng Zhang, Wuhan (CN); Guanghui Liu, Wuhan (CN); Chao Wang, Wuhan (CN)

(*) Notice: Subject to any disclaimer, the term of this patent is extended or adjusted under 35 U.S.C. 154(b) by 0 days.

(21) Appl. No.: 16/612,384

(22) PCT Filed: Oct. 29, 2019

(86) PCT No.: PCT/CN2019/114144
§ 371 (c)(1),
(2) Date: Nov. 10, 2019

(30) Foreign Application Priority Data

May 10, 2019 (CN) .......................... 2019 1 0387457

(51) Int. Cl.
*F21V 8/00* (2006.01)
(52) U.S. Cl.
CPC ......... *G02B 6/0046* (2013.01); *G02B 6/0055* (2013.01); *G02B 6/0083* (2013.01)
(58) Field of Classification Search
CPC .. G02B 6/0046; G02B 6/0055; G02B 6/0083; G02B 7/02; G02B 27/0075; G02B 27/0955; H04N 5/2354; H04N 5/2254; H04N 5/22541
See application file for complete search history.

(56) References Cited

U.S. PATENT DOCUMENTS

| 10,473,844 | B2* | 11/2019 | Han ...................... G02B 6/0045 |
| 2006/0203485 | A1* | 9/2006 | Fu .......................... H01H 13/83 |
| | | | 362/237 |
| 2008/0112183 | A1* | 5/2008 | Negley ...................... F21K 9/61 |
| | | | 362/555 |
| 2014/0340927 | A1* | 11/2014 | Johnston ................... F21K 9/61 |
| | | | 362/555 |
| 2017/0123140 | A1* | 5/2017 | Han ...................... G02B 6/0045 |
| 2017/0227703 | A1* | 8/2017 | Montgomery ....... G02B 6/0055 |
| 2018/0262662 | A1* | 9/2018 | Iwaguchi ........... G02B 19/0028 |

* cited by examiner

*Primary Examiner* — Joseph L Williams
*Assistant Examiner* — Jose M Diaz

(57) ABSTRACT

The present invention provides a panel device for the under-display camera. The panel device includes a display panel, a backlight module, a light guiding member, and a light source member. The backlight module is provided with a first opening. The light guiding member is inserted into the first opening for guiding light entering the light guiding member to a display panel area corresponding to the first opening. The light source member provides a light source for the light guiding member. The light source member is turned off when the under-display camera is turned on, and the light source member is turned on or off when the under-display camera is turned off. Therefore, a through hole or a blind hole on the display panel can be re-displayed, and the image quality that can be obtained by the under-display camera is still maintained.

10 Claims, 2 Drawing Sheets

PANEL DEVICE FOR UNDER-DISPLAY CAMERA

FIELD OF INVENTION

The present disclosure relates to the field of display technologies, and in particular, to a panel device for an under-display camera.

BACKGROUND OF INVENTION

With development of liquid crystal display technology, especially development of full screen technology, most manufacturers currently install a backlight module of a display device with an opening facing inward, so that an under-display camera can be placed correspondingly, and thereby receiving incident light of the environment from the outside world.

In detail, basic structure of the liquid crystal display device includes a display panel, an integrated circuit (a source driver and a drain driver), a flexible printed circuit board, a backlight module, and the like. The backlight module further includes components such as a light source, a light guide plate, a diffusion sheet, a brightness enhancement sheet, and a backplane.

Referring to FIG. 1, in a panel device 300 of the prior art, when an under-display camera 200 is correspondingly disposed under an opening 322 of a backlight module 320 of the panel device 300, the opening 322 will only serve as a transceiver channel for the under-display camera 200 to receive ambient light. Because the inner side of the opening 322 is not provided with any light source to provide brightness, when the panel device 300 is in use, the backlight module 320 will be in an idle state in the area of the opening 322 and cannot provide any display effect.

Therefore, there is a need to provide a panel device for an under-display camera to solve the problems of the prior art.

SUMMARY OF INVENTION

In order to solve the above technical problem, an object of the present disclosure is to provide a panel device applied to an under-display camera under. The light guiding member and the light source member of the panel device can provide auxiliary light to the display panel corresponding to the top of a first opening at a position where the first opening of the backlight module corresponding to the under-display camera. A through hole or blind hole on a display panel in the prior art which is in an idle state and cannot provide any display effect can be redisplayed. Moreover, the image quality that can be obtained by the under-display camera is maintained, thereby improving the application scenario and the use experience of the terminal product, and thereby being competitive.

To achieve the above object, the present invention provides a panel device for an under-display camera. The panel device comprises: a display panel, a backlight module, a light guiding member, and a light source member. The backlight module is disposed at one side of the display panel, and is provided with a first opening at a position corresponding to the under-display camera. The light guiding member is inserted in the first opening for guiding light entering the light guiding member to a display panel area corresponding to the first opening. The light source member is used for providing a light source for the light guiding member.

In an embodiment of the present invention, the light guiding member is provided with a second opening at a position corresponding to the under-display camera, and a corresponding position to the light guiding member and the light source member is provided with a light incident surface, a light emitting surface is disposed on an inner wall of the second opening, and an angle between the light emitting surface and the light incident surface is an acute angle.

In an embodiment of the present invention, a light blocking film is disposed between the backlight module and the light guiding member, and the light incident surface is disposed at one end of the light guiding member.

In an embodiment of the present invention, the light guiding member is a light guiding ring.

In an embodiment of the present invention, the panel device further comprises a control component electrically connected to the under-display camera and the light source member, respectively, for controlling the light source member to be turned off when the under-display camera is turned on, and controlling the light source member to be turned on or off when the under-display camera is turned off.

In an embodiment of the present invention, the light source member is a light emitting diode (LED) light source or a mini LED light source.

In an embodiment of the present invention, the light guiding member is made of a transparent material or a matte material.

In an embodiment of the present invention, the display panel is a display panel having a through hole or a blind hole.

In an embodiment of the present invention, the backlight module has a back plate as a back surface.

In an embodiment of the present invention, the backlight module has a reflective film as a back surface.

In order to further understand the features and technical details of the present invention, please refer to the following detailed description and drawings regarding the present invention. The drawings are provided for reference and description only and are not intended to limit the present invention.

DETAILED DESCRIPTION OF PREFERRED EMBODIMENTS

The following embodiments refer to the accompanying figures for exemplifying specific implementable embodiments of the present disclosure in a suitable computing environment. It should be noted that the exemplary described embodiments are configured to describe and understand the present disclosure, but the present disclosure is not limited thereto. Directional terms, such as an upper side, a lower side, a front side, a back side, a left side, a right side, an inner side, an outer side, and a lateral side, mentioned in the present disclosure are only for reference. Therefore, the directional terms are used for describing and understanding rather than limiting the present disclosure.

In the figures, units having similar structures are used for the same reference numbers.

Figure 1:
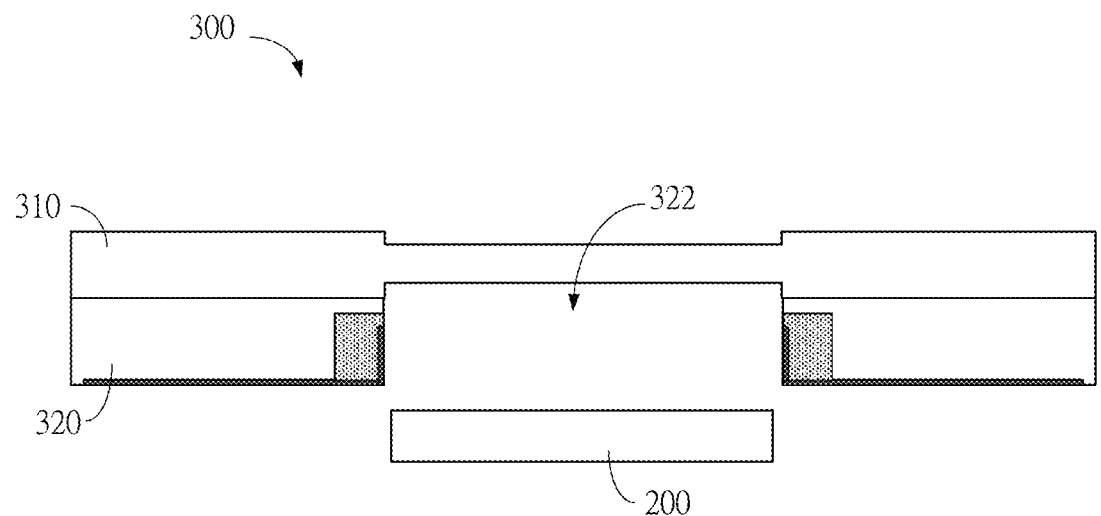
FIG. 1 shows a schematic view of a panel device according to the prior art.
Figure 2:
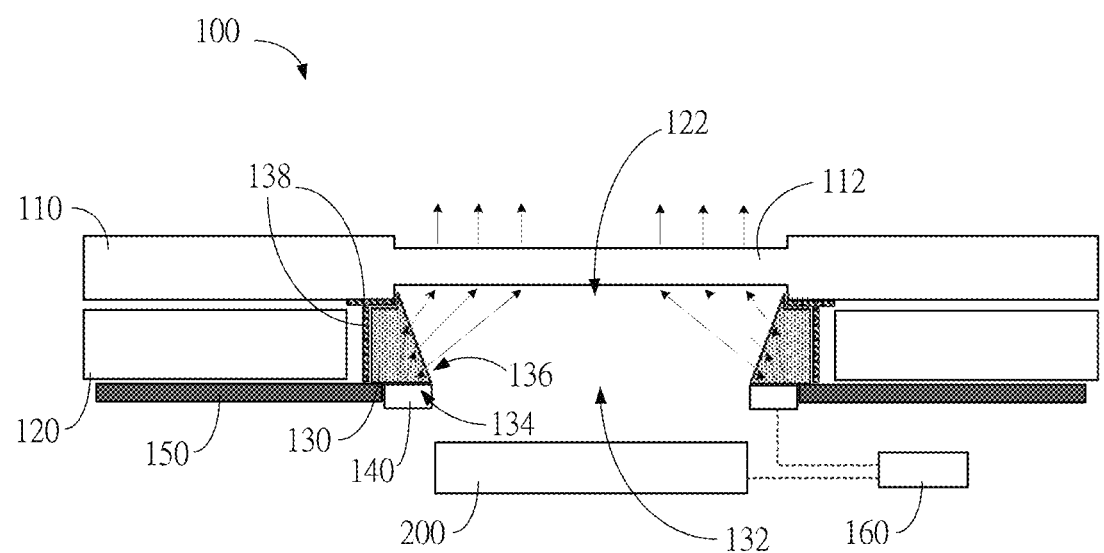
FIG. 2 is a cross-sectional structural view showing a first embodiment of a panel device for an under-display camera according to the present invention.

FIG. 2 is a cross-sectional structural view showing a first embodiment of a panel device for an under-display camera according to the present invention.

As the figure shows, the present invention provides a panel device 100 for an under-display camera 200. The panel device 100 comprises: a display panel 110, a backlight module 120, a light guiding member 130, and a light source member 140.

The backlight module 120 is disposed at one side of the display panel 110, and is provided with a first opening 122 at a position corresponding to the under-display camera 200. The light guiding member 130 is inserted in the first opening 122 for guiding light entering the light guiding member 130 to a display panel area 122 corresponding to the first opening 122. The light source member 140 is used for providing a light source for the light guiding member 130.

The light guiding member 130 is provided with a second opening 132 at a position corresponding to the under-display camera 200, and a corresponding position to the light guiding member 130 and the light source member 140 is provided with a light incident surface 134, a light emitting surface 136 is disposed on an inner wall of the second opening 132, and an angle between the light emitting surface 136 and the light incident surface 134 is an acute angle. In practical applications, the angle between the light emitting surface 136 and the light incident surface 134 may be 10 degrees, 20 degrees, 30 degrees, 45 degrees, 50 degrees, 60 degrees, 70 degrees, 80 degrees, etc. The light beam entering from the light incident surface 134 is projected to the display panel area 312 corresponding to the second opening 132 when being emitted from the light emitting surface 136 to compensate the under-display camera 200. The corresponding display panel area 312 has an additional light source, so that the partial area of the display panel can be displayed normally without affecting the normal operation of the under-display camera 200.

A light blocking film 138 is disposed between the backlight module 120 and the light guiding member 130, and the light emitting surface 136 is disposed at one end of the light guiding member 130.

In a preferred embodiment of the present invention, the light guiding member 130 is a light guiding ring, but is not limited thereto. In other words, the light guiding member 130 may have other aspects or shapes such as a square or a polygon, in addition to being annular. The light guiding member 130 of these types also have the effect of guiding the light beam entering the light guiding member 130 to the display panel area 312 corresponding to the first opening 122.

The panel device 100 further comprises a control component 160 electrically connected to the under-display camera 200 and the light source member 140, respectively, for controlling the light source member 140 to be turned off when the under-display camera 200 is turned on, and controlling the light source member 140 to be turned on or off when the under-display camera 200 is turned off.

In detail, when the under-display camera 200 is activated, the light source member 140 will be turned off so that the under-display camera 200 can receive the ambient light source from the outside without being affected. When the under-display camera 200 is not activated, the light source member 140 can be turned on according to the actual display condition of the display panel 110 and emit a light beam toward the display panel area 112 of the display panel 110 to provide brightness, or capable of causing the light source member 140 to be in a closed state when not being displayed without emitting a light beam toward the display panel area 112 of the display panel 110, such that the display panel area 112 corresponding to the first opening 122 is in full black state. Therefore, a through hole or blind hole on a display panel in the prior art which is in an idle state and cannot provide any display effect can be redisplayed. Moreover, the image quality that can be obtained by the under-display camera is maintained, thereby improving the application scenario and the use experience of the terminal product (i.e. the display panel using the full screen technology), and thereby being competitive.

Referring to FIG. 2 again. In detail, in the first embodiment, the light emitting surface 136 of the light guiding member 130 is configured to guide the light beam emitted by the light source member 140 toward the display panel 110 disposed at the first opening 122. This provides appropriate brightness for the display panel area 112 corresponding to the first opening 122. Therefore, in the present invention, the light emitting surface 136 preferably has a slope facing the display panel area 112 corresponding to the first opening 122, but is not limited thereto.

Moreover, the surface of the light emitting surface 136 may further have a microstructure, so that the light emitted from the light emitting surface 136 may be distributed as evenly as possible inside the first opening 122 due to the arrangement of the microstructure. Thereby, the display panel area 112 corresponding to the first opening 122 has a uniform brightness.

The following description will be made in accordance with the actual operation of the present invention. Under normal operation, as shown in FIG. 2, when the under-display camera 200 is activated, the light source member 140 is turned off so that the under-display camera 200 can receive an external ambient light source without being affected, thereby obtaining an image to be taken. On the other hand, when the under-display camera 200 is not activated, the light source member 140 can be turned on and emits a light beam toward the display panel 110 by the light emitting surface 136 of the light guiding member 130 to provide brightness, so that the display panel 110 disposed above the first opening 122 may thus have display capability. Alternatively, the light source member 140 can be selectively turned off depending on other usage requirements.

In a preferred embodiment of the present invention, the light source member 140 is a light emitting diode (LED) light source or a mini LED light source. The light guiding member 130 is made of a transparent material or a matte material. Thus, the light beam emitted from the light source member 140 is effectively guided to the light emitting surface 136 to be emitted toward the display panel area 112 corresponding to the first opening 122, thereby reducing the light loss of the light source member 140.

In addition, a light blocking film 138 is further disposed between the backlight module 120 and the light guiding member 130. The light blocking film 138 can block the light from the inside of the backlight module 120 from leaking out to the central area of the first opening 122 by the arrangement of the light blocking film 138, thereby avoiding affecting the image quality of the under-display camera 200.

Figure 3:
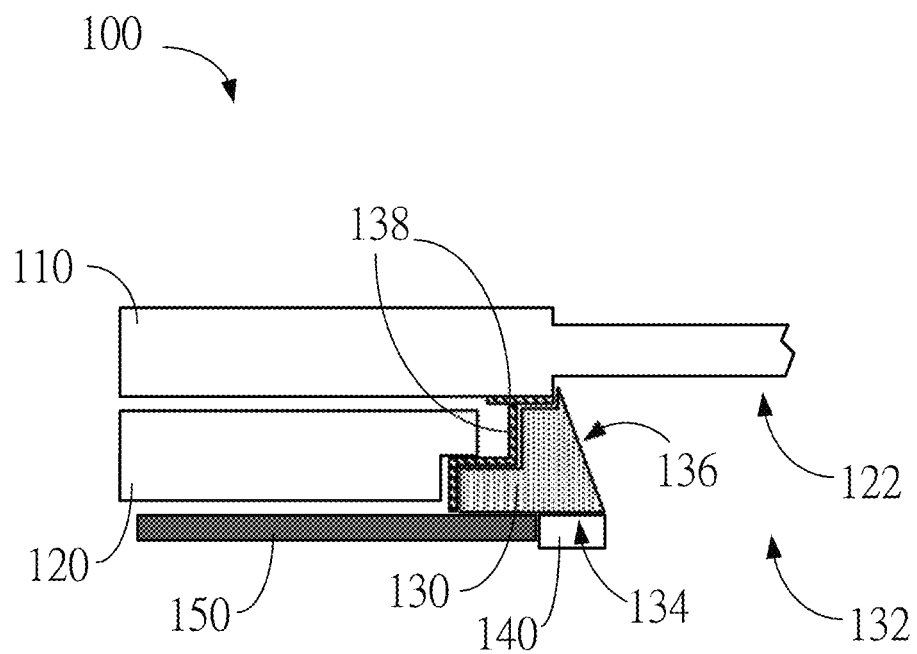
FIG. 3 is a cross-sectional structural view showing a second embodiment of the panel device for an under-display camera according to the present invention.
Figure 4:
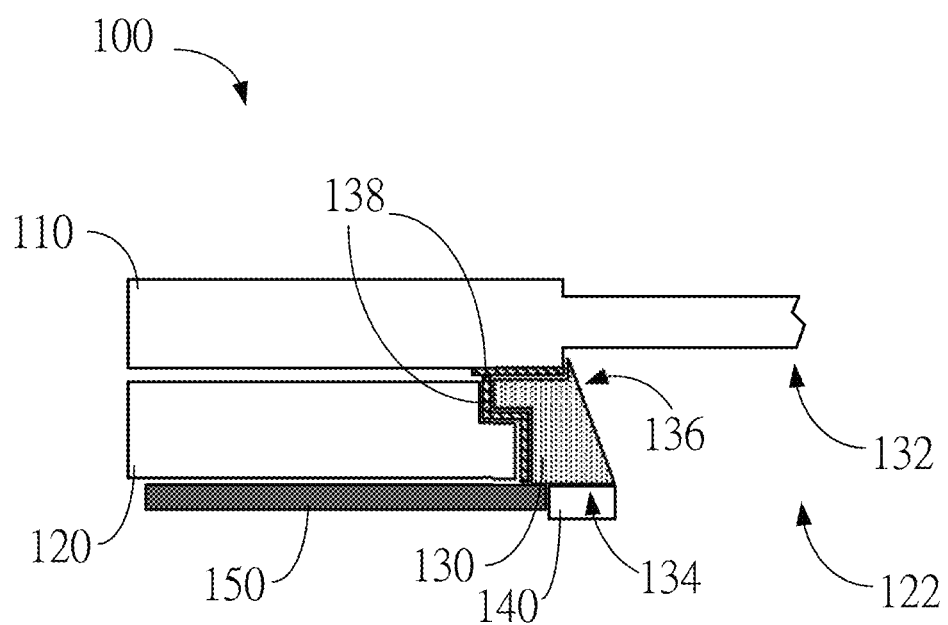
FIG. 4 is a cross-sectional structural view showing a third embodiment of the panel device for an under-display camera according to the present invention.

In addition to the first embodiment of FIG. 2, the light guiding member 130 of the panel device 100 of the present invention further have different backlight module 120 designs. Corresponding change is a cross-sectional structure as illustrated in FIG. 3 or FIG. 4, and the light beam emitted by the light source member 140 is guided to correspond to the same by the arrangement of the light emitting surface 136 of the light guiding member 130. The display panel area 112 at the first opening 122 is emitted, thereby providing appropriate brightness for the display panel area 112 at the first opening 122.

It should be noted that when the light guiding member 130 is disposed in the cross-sectional structure of FIG. 3 or FIG. 4, the light blocking film 138 disposed at the boundary between the light guiding member 130 and the backlight module 120 will also change its shape accordingly, and thus the light blocking film 138 can block the light from the inside of the backlight module 120 from leaking out to the central area of the first opening 122 by the arrangement of the light blocking film 138, thereby avoiding affecting the image quality of the under-display camera 200.

In the present invention, the display panel 100 is a display panel having a through hole (e.g. a hole, a water drop, a notch, and an out-of-plane, etc.) or a blind hole. Therefore, the problem that when the display panel having the through hole or the blind hole, the through hole area or the blind hole area can not used for displaying can be eliminated. Further, the backlight module 120 may use the back plate 150 or the reflective film as the back surface to uniformly or effectively utilize the light emitted by the backlight module 120.

In summary, the backlight module 120 of the panel device 100 can be disposed in the area of the first opening 122 to provide light and brightness control by the arrangement of the light guiding member 130 and the light source member 140 of the present invention. Therefore, a through hole or blind hole on a display panel in the prior art which is in an idle state and cannot provide any display effect can be redisplayed. Moreover, the image quality that can be obtained by the under-display camera is maintained, thereby improving the application scenario and the use experience of the terminal product, and thereby being competitive.

The present invention has been shown and described with respect to one or more embodiments, and equivalents and modifications will be apparent to those of ordinary skill in the art. The present invention includes all such modifications and variations, and is only limited by the scope of the appended claims. With particular regard to the various functions performed by the above-described components, the terms used to describe such components are intended to correspond to any component that performs the specified function of the component (e.g. which is functionally equivalent) (unless otherwise indicated). Even if it is structurally not identical to the disclosed structure for performing the functions in the exemplary implementation of the present specification shown herein. Moreover, although specific features of the specification have been disclosed with respect to only one of several implementations, such features may be combined with one or more other implementations as may be desired and advantageous for a given or particular application. Furthermore, the terms "enclose," "has," or "include" are used in the particular embodiments or claims, and such terms are intended to be encompassed in a manner similar to the term "comprise."

The above is only a preferred embodiment of the present invention, and it should be noted that those skilled in the art can also make several improvements and refinements without departing from the principles of the present invention. These improvements and refinements should also be considered as protected range of the present invention.

What is claimed is:

1. A panel device for an under-display camera, comprising:
   a display panel;
   a backlight module disposed at one side of the display panel, and provided with a first opening at a position corresponding to the under-display camera;
   a light guiding member inserted in the first opening for guiding light entering the light guiding member to a display panel area corresponding to the first opening; and
   a light source member for providing a light source for the light guiding member.

2. The panel device for the under-display camera as claimed in claim 1, wherein the light guiding member is provided with a second opening at a position corresponding to the under-display camera, and a corresponding position to the light guiding member and the light source member is provided with a light incident surface, a light emitting surface is disposed on an inner wall of the second opening, and an angle between the light emitting surface and the light incident surface is an acute angle.

3. The panel device for the under-display camera as claimed in claim 2, wherein a light blocking film is disposed between the backlight module and the light guiding member, and the light incident surface is disposed at one end of the light guiding member.

4. The panel device for the under-display camera as claimed in claim 1, wherein the light guiding member is a light guiding ring.

5. The panel device for the under-display camera as claimed in claim 1, wherein the panel device further comprises a control component electrically connected to the under-display camera and the light source member, respectively, for controlling the light source member to be turned off when the under-display camera is turned on, and controlling the light source member to be turned on or off when the under-display camera is turned off.

6. The panel device for the under-display camera as claimed in claim 1, wherein the light source member is a light emitting diode (LED) light source or a mini LED light source.

7. The panel device for the under-display camera as claimed in claim 1, wherein the light guiding member is made of a transparent material or a matte material.

8. The panel device for the under-display camera as claimed in claim 1, wherein the display panel is a display panel having a through hole or a blind hole.

9. The panel device for the under-display camera as claimed in claim 1, wherein the backlight module has a back plate as a back surface.

10. The panel device for the under-display camera as claimed in claim 1, wherein the backlight module has a reflective film as a back surface.

* * * * *